United States Patent
Wu et al.

(10) Patent No.: US 10,620,038 B2
(45) Date of Patent: Apr. 14, 2020

(54) DISTRIBUTED OPTICAL FIBER SENSING SIGNAL PROCESSING METHOD FOR SAFETY MONITORING OF UNDERGROUND PIPE NETWORK

(71) Applicant: University of Electronic Science and Technology of China, Chengdu, Sichuan (CN)

(72) Inventors: Huijuan Wu, Sichuan (CN); Wei Zhang, Sichuan (CN); Xiangrong Liu, Sichuan (CN); Yunjiang Rao, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 134 days.

(21) Appl. No.: 15/812,996

(22) Filed: Nov. 14, 2017

(65) Prior Publication Data
US 2018/0080812 A1   Mar. 22, 2018

(30) Foreign Application Priority Data
Jul. 25, 2017   (CN) .......................... 2017 1 0613247

(51) Int. Cl.
| | | |
|---|---|---|
| G01V 1/28 | (2006.01) | |
| G01V 1/20 | (2006.01) | |
| G06F 17/12 | (2006.01) | |
| G01H 9/00 | (2006.01) | |
| G06N 7/00 | (2006.01) | |
| G01V 1/18 | (2006.01) | |
| G01V 1/22 | (2006.01) | |
| G06N 5/04 | (2006.01) | |
| H04B 10/25 | (2013.01) | |

(52) U.S. Cl.
CPC ................ G01H 9/004 (2013.01); G01V 1/18 (2013.01); G01V 1/288 (2013.01); G06N 7/005 (2013.01); G01V 1/208 (2013.01); G01V 1/226 (2013.01); G06F 17/12 (2013.01); G06N 5/04 (2013.01); H04B 10/25 (2013.01)

(58) Field of Classification Search
CPC .......... G01H 9/004; G01V 1/18; G01V 1/288; G01V 1/208; G06F 17/12
See application file for complete search history.

(56) References Cited

PUBLICATIONS

Qian Sun, Hao Feng, Xueying Yan, and Zhoumo Zeng, Recognition of a Phase-Sensitivity OTDR Sensing System Based on Morphologic Feature Extraction, Published online Jun. 29, 2015, Sensors (Basel). Jul. 2015; 15(7): 15179-15197. (Year: 2015).*

* cited by examiner

Primary Examiner — Matthew G Marini

(57) ABSTRACT

A distributed optical fiber sensing signal processing method for safety monitoring of underground pipe network, which belongs to infrastructure safety monitoring field, which is aimed to improve the intelligent ability of detection and identification of the existing distributed optical fiber sound/vibration sensing system under complex application conditions. The present invention utilizes the distributed optical fiber sound/vibration sensing system to pick up the sound or vibration signal of the whole line along the detection cable; and the customized short time feature and long time feature are respectively extracted from the relative quantity of the sound or the vibration signal at each spatial point in the whole monitoring range. The Bayesian identification and classification network at each spatial point is constructed and trained based on the prior knowledge of the collected signal features and their different background noises.

3 Claims, 6 Drawing Sheets

DISTRIBUTED OPTICAL FIBER SENSING SIGNAL PROCESSING METHOD FOR SAFETY MONITORING OF UNDERGROUND PIPE NETWORK

CROSS REFERENCE OF RELATED APPLICATION

The present invention claims priority under 35 U.S.C. 119(a-d) to CN 201710613247.4, filed Jul. 25, 2017.

BACKGROUND OF THE PRESENT INVENTION

Field of Invention

A distributed optical fiber sensing signal processing method for safety monitoring of underground pipe network is applicable to the underground pipe network and long distance pipeline safety monitoring, which belongs to underground pipe network, long distance pipeline, communication cable, power cable, perimeter and structure safety monitoring fields.

Description of Related Arts

The urban underground pipe networks such as water, gas, heat and oil pipes are the city's blood vessels and lifelines, and their safe operation is an essential guarantee for people's lives and property. However, pipeline leakage accidents occurred frequently, such as Qingdao "11.22" oil pipeline deflagration caused by leakage, Dalian oil pipeline fire caused by leakage, Taiwan Kaohsiung propane leakage and other accidents, which are painful lessons. The main causes of these accidents are analyzed to be caused by the external damages to the oil and gas pipelines. In addition, according to the statistics, 39.6% of leakage accidents in the United States, 49.7% in Europe and 58.7% in China are caused by external damage or interference, which is much greater than the impact of corrosion aging. Therefore, it is an important issue the pipe network security department need to solve, which is including the application of the Internet of Things technology for real-time monitoring of underground pipe network, and timely prediction and alarm of the external damage and other hidden events, and thus it can take preventive measures.

As a representative of distributed fiber optic sensing technology, phase-sensitive optical time domain reflection technique (Φ-OTDR) detects the spatial distribution and temporal variation of physical quantities such as sound waves, vibrations and etc in environment along the line by optical fiber. This technology has powerful long-distance multi-point positioning ability and high sensitivity, besides, there is no functional device in fiber and its life span is always long, and this technology can be easily constructed and maintained with single-ended detection way. Thus it is an important technical means for large-scale environmental safety monitoring and plays an important role in pipeline safety, optical and power cable safety, railway safety, civil structure health monitoring and perimeter security and etc. According to the methods of sensing and demodulation, Φ-OTDR technology is divided into two main categories: 1) For the intensity demodulation method which is based on the direct or heterodyne detection, the relationship between the photonic current signal and phase change caused by vibration source is non-linear, as $I \sim \cos(\Delta\phi(t))$, and this method has low response sensitivity to abnormal events, thus it is commonly used for distributed vibration sensing; 2) For the linear demodulation based on non-equilibrium Mach-Zehnder, Michelson interferometer or other methods, the relationship between the photonic current signal and the vibration source is linear, as $I \sim \Delta\phi(t)$, and its response sensitivity is high to the abnormal events, thus it is commonly used for distributed sound and vibration sensing.

In the actual application of the existing distributed optical fiber sound/vibration sensing system based on the linear demodulation, the fiber sensing signal is decaying with the distance which will result in that the amplitude of the signal collected from each points along the whole line is unevenly distributed. The interfering environment is completed in a wide range monitoring, especially at different sections or different locations, the buried environments are very different. For example, some sections are buried near the railways, some of which are buried near the roads, and some are buried near the factories or rivers, thus the perceived interference sources at different points are different. At present, if the detection and the identification for the signals of different interference sources at all points in the whole line are merely based on the features of these signals and the identification network trained at one point, it will easily result in poor adaptive ability of algorithm and high false alarm rate of the system. Therefore, the present invention proposes to construct the identification network at each spatial point respectively, which is based on the prior knowledge of the sensing signals and the interference sources at different points, and the extraction method for the short time and long time feature of the relative value of signal. Despite the monitoring range of the distributed optical fiber sound/vibration sensing system is very wide, and the signal amplitude distribution of the whole monitoring line is uneven, and the environment at each section is inconsistent, the capability of the distributed intelligent identification to the sound and vibration target sources is also improved.

SUMMARY OF THE PRESENT INVENTION

The present invention is intend to solve the problem in current distributed optical fiber sound/vibration sensing system that the algorithm does not have the ability to adapt to the new environments and the false alarm rate of the system is relatively high, which are caused by uneven distribution of signal amplitude collected at each point due to the attenuation with distance of the entire optical fiber signals, and the complication of the environment to monitor in a wide range, especially that the embedding environment at different sections and points differs a lot. The present invention provides a distributed optical fiber sensing signal processing method for safety monitoring of an underground pipe network.

A distributed optical fiber sensing signal processing method for safety monitoring of an underground pipe network, comprising steps of:

(1) picking up sound or vibration signal at each point along a line of a detection cable laid within a monitoring range;

(2) extracting a customized short time feature from the sound or the vibration signal collected in a whole monitoring area according to a relative value of the signal at each spatial point; and (3) detecting an abnormal event at each spatial point according to the short time feature, wherein a long time feature is calculated and accumulated for the signal of the abnormal event, then values of these features are discretized after calculation and accumulation, then a discrete value of feature is input into a Bayesian identification and classification network which is trained for each spatial point to realize identification and classification.

The detailed steps of the step (3) are:

Step (3).1 setting a judgement threshold and detecting abnormality of the sound or the vibration signal at each spatial point according to the short time feature thereof;

Steps (3).2 if the abnormal event is detected at a certain spatial point, calculating and accumulating long time features at this point from the moment when the abnormal event occurs, then the values of these features are discretized after calculation and accumulation; and Steps (3).3 inputting discretized results into the Bayesian identification and classification network which is trained for the corresponding spatial point to execute identification and classification.

In the Step 3, detailed steps of construction of the Bayesian identification and classification network which is trained for each spatial point are:

Step 31, accumulating and preprocessing the sound or the vibration signal, wherein then a typical event data training set is built based on a long time signal which is obtained from pretreatment;

Step 32, extracting the customized short time feature from the relative value of the signal for the typical event data training set, wherein the long time feature is calculated and accumulated, after the extraction, then the typical event data training set is transformed into a long time data training set related thereof; and Step 33, constructing the Bayesian identification classification network topology and learning the parameter based on the probability distribution information of the long time feature in the long time data training set and combined with prior probability information of a background environment at each spatial point, thus obtaining the trained Bayesian identification classification network.

Detailed steps of the Step 31 are:

Step 311, collecting the sound or the vibration signal at each spatial point along with periodic trigger pulses, wherein the signal collected in the whole monitoring range at the k-th trigger pulse period is denoted as:

$$X_k = \{x_{ki}(i=1,2,\ldots,N)\} = [x_{k1}, x_{k2}, \ldots, x_{kN}] \quad (1)$$

in Eq. (1), N is a total number of data collected in the whole monitoring range;

Step 312, accumulating the sound or the vibration signal along a temporal axis at each light pulse trigger period, wherein then a temporal-spatial signal response matrix with N spatial dimensions and T temporal dimensions is constructed, $$XX = \{x_{ki}(k=1,2,\ldots,T; i=1,2,\ldots,N)\} \quad (2)$$

Step 313, in the matrix with the N spatial dimensions and the T temporal dimensions, defining a short time signal accumulated in an i th spatial point or an i th sampling node as:

$$w_i = \{x_{ki}, k=1,2,\ldots,M\} \quad (3)$$

Step 314, accumulating short time signals of m length on the temporal axis and constituting a long time signal at each spatial point:

$$W_i = \{x_{ki}, k=1,2,\ldots,L\}$$

$$L = m \times M \; m \geq 1, \quad (4)$$

wherein L is a data length of the long time signal, M is a data length of the short time signal; and Step 315, accumulating the long time signal for a spatial length in L, wherein then attaching an event type tag to the long time signal according to a type of an event which occurs, and adding it to a database to construct a typical event data training set.

Detailed steps of the Step 32 are:

Step 321, extracting four customized short time features based on a relative quantity of the short time signal: a primary impulse intensity feature $A_1$, a secondary impulse intensity feature $A_2$, a primary and secondary impulse amplitude ratio feature $A_3$, and a wavelet packet energy spectrum feature $A_4$;

Step 322, based on the short time features, calculating and accumulating six customized long time features, which include a long time primary impulse intensity feature $B_1$, a long time secondary impulse intensity feature $B_2$, a long time amplitude ratio feature $B_3$, a long time wavelet packet energy spectrum feature $B_4$, a long time environmental background feature $B_5$ and a long time strict impulse number feature $B_6$; and Step 323, according to the long time features and corresponding event type tags thereof, transforming the typical event data training set into the long time feature training set.

Detailed steps of the Step 321 are:

using an extraction method to obtain the primary impulse intensity feature $A_1$, wherein the short time signal $w_1$ is taken as a processing object for short time feature extraction; first, a histogram statistics is carried out for short time signal amplitude values; an amplitude range of the short time signal $w_i$ is divided into 10 consecutive intervals; max ($w_i$) represents a maximum value of $w_i$, min ($w_i$) represents a minimum value of $w_i$, and each interval is recorded as $s_l(l=1, 2, \ldots, 10)$, that is:

$$s_l = [(l-1) \times \text{averagelength} + \min(w_i), l \times \text{averagelength} + \min(w_i)], (l=1,2,\ldots,10) \quad (5);$$

in Eq. (5), averagelength is a width of each interval, that is:

$$averlength = \frac{\max(w_i) - \min(w_i)}{10}; \quad (6)$$

calculating a corresponding sampling point number distributed in each interval for the short time period signal $w_i$ and generate a distribution histogram, namely computing the percentage of each interval percent:

$$\begin{cases} \text{percent} = \{percent_l, l = 1, 2, \ldots, 10\} \\ percent_l = \frac{n_l}{M} \end{cases} \quad (7)$$

in Eq. (7), $n_l$ is a sampling point number of the short time signal, whose amplitudes range in $s_l$, M is a data length of the short time signal; wherein assuming that a maximum of $percent_l(l \in [1,10])$ is obtained at l=q, wherein q is an amplitude interval corresponding to a highest point of the histogram, the primary impulse intensity feature $A_1$ is computed as:

$$A_1 = \begin{cases} p_q + p_{q+1} & (q \in [2, 9], p_{q-1} \leq p_{q+1}) \\ P_q + P_{q-1} & (q \in [2, 9], P_{q-1} > P_{q+1}) \\ p_q + p_{q+1} & (q = 1) \\ p_q + p_{q-1} & (q = 10) \end{cases} \quad (8);$$

using an extraction method to obtain the secondary impulse intensity feature $A_2$, wherein assuming that an absolute maximum value of the short time signal $w_i=\{x_{ki}\ k=1, 2, \ldots, M\}$ is obtained at k=t, wherein t is a time when an absolute value of the short time signal is max; then M/4 sampling points near k=t is removed from $w_i$ to obtain remaining 3M/4 sampling points, which constitute a time sequence $w'_i$, wherein M is a period of the short time signal:

$$w'_i = \begin{cases} x_{ki}\left(k = 1, 2, \ldots, t-\frac{M}{8}, t+\frac{M}{8}, t+\frac{M}{8}+1, \ldots, M\right)\left(\frac{M}{8} < t < \frac{7M}{8}\right) \\ x_{ki}\left(k = \frac{M}{4}+1, \frac{M}{4}+2, \ldots, M\right)\left(t \leq \frac{M}{8}\right) \\ x_{ki}\left(k = 1, 2, \ldots, \frac{3M}{4}\right)\left(t \geq \frac{7M}{8}\right) \end{cases} ; \quad (9)$$

finally, the secondary impulse intensity feature $A_2$ is extracted for $w'_i$ by the same method as that of extracting the primary impulse feature $A_1$;

using an extraction method to obtain the primary and secondary impulse amplitude ratio feature $A_3$:

$$A_3 = \frac{\max(|w'_i|)}{\max(|w_i|)}; \quad (10)$$

in Eq. (10), $\max(|w'_i|)$ represents a maximum absolute value of an amplitude of the time series signal $w'_i$; $\max(|w_i|)$ represents a maximum absolute value of an amplitude of the time series signal $w_i$; and using an extraction method to obtain wavelet packet energy spectrum feature $A_4$, wherein a three-layer db6 wavelet packet decomposition is carried out on the short time signal $w_i$; decomposed sub-bands is sorted from low to high according to a frequency component, which is marked as $s_0 \sim s_7$; finally, wavelet packet coefficient energy of each frequency band is calculated to form a wavelet packet coefficient energy feature vector $E_{wp}=[E_0, E_1, \ldots, E_7]$; the wavelet packet energy spectrum feature $A_4$ is obtained as:

$$A_4 = \frac{E_2 + E_3}{E_0 + E_1}; \quad (11)$$

in the Eq. (11), $E_2$, $E_3$ represent energy of medium and low frequency sub-bands, $E_0$, $E_1$ represent energy of the low frequency sub-bands.

The step 322 comprises steps of:

Step 3221, initialization: Setting a variable t=1; denoting a set $T_1=\emptyset, T_2=\emptyset, T_3=\emptyset, T_4=\emptyset, T_5=\emptyset, T_6=\emptyset$, which means they are all empty sets at the beginning; and considering the long time signal as m short time signals $w_{i,t}$ (t=1, 2, \ldots, m), wherein $w_{i,t}$ represents a t th short time signal; and Step 3222, denoting values of the short time features $A_1$, $A_2$, $A_3$, $A_4$ of the short time signal as a1, a2, a3, a4 respectively; wherein if a1>thr, the short time signal is judged to be the abnormal event, a1, a2, a3, a4 are added to the sets T1, T2, T3, T4 respectively; if a1<thr, the short time signal is judged to be normal event, a1 is added to the set T5; if a1>thr and a2<thr1, a3<thr2, which meets strict impulse conditions, a1 is put into the set T6; thr, thr1, thr2 are empirical thresholds to judge an impulse intensity strong or weak respectively; averaging the short time feature values in the set T1, T2, T3, T4, T5 to obtain values of $B_1$, $B_2$, $B_3$, $B_4$, $B_5$ in turn:

$$B_1=\text{average}(T1), B_2=\text{average}(T2), B_3=\text{average}(T3),$$
$$B_4=\text{average}(T4) \quad (12);$$

$$B_5=\text{average}(T5) \quad (13);$$

wherein a number of the long time impulse feature $B_6$ is calculated as:

$$B_6=\text{length}(T6) \quad (14);$$

Eq. (14) represents a number of data in the set T6, that is, the impulse number meeting short time strict impulse conditions in the long time period.

The step 33 comprises steps of:

Step 331, discretizing the long time feature training set to construct a discrete long time feature training set;

Step 332, according to mutual information of all long time feature attribute nodes and class nodes obtained from the discrete long time feature training set at each spatial point, and conditional mutual information between feature attribute nodes under a class node condition, constructing a Bayesian network topology; and Step 333, constructing the Bayesian network topology at each spatial point; wherein parameters are further learned based on the constructed Bayesian network topology to obtain the trained Bayesian identification classification network.

The step 332 comprises steps of:

Step 3321, calculating the mutual information between the long time feature attribute node and the class node:

wherein the mutual information between all the long time feature attribute node $B_j$ and the class node C is calculated as follows:

$$I(B_j; C) = \sum_{b \in S_b} \sum_{c \in \{1,2\}} p(b'_j, c) \log \frac{p(b'_j, c)}{p(b'_j)p(c)} \quad (15)$$

$$(j = 1, 2, \ldots, 6);$$

in Eq. (15), $S_b$ denotes a set of all possible discrete values taken for the long time feature attribute node $B_j$(j=1, 2, \ldots, 6), $p(b'_j, c)$ represents a joint probability when $B_j=b'_j$, C=c; $p(b'_j)$ represents a probability when $B_j=b'_j$; values of $p(b'_j, c)$ and $p(b'_j)$ are obtained from the discrete long time feature training set, and a calculation method is: $p(b_j, c)$ equals a number of records in the discrete long time feature training set when $B_j=b'_j$, C=c, divided by a total number of records in the discrete long time feature training sets; and $p(b'_j)$ equals a number of records in the discrete long time feature training set when $B_j=b'_j$, divided by the total number of records in the discrete long time feature training sets;

Step 3322, calculating the conditional mutual information between each two of the feature attribute nodes under the class node condition;

wherein according to the discrete long time feature training set, calculation of the condition mutual information between each two feature attribute nodes $B_i$, $B_j$(i≠j, and i=1, 2, \ldots, 6, j=1, 2, \ldots, 6) under the condition of class node C is:

$$I(B_i; B_j \mid C) = \sum_{b'_i=0}^{n} \sum_{b'_j=0}^{h} \sum_{c=1}^{2} p(b'_i, b'_j, c) \log \frac{p(b'_i, b'_j \mid c)}{p(b'_i \mid c)p(b'_j \mid c)}, \quad (16)$$

$$(i = 1, 2, \ldots, 6, j = 1, 2, \ldots, 6; i \neq j);$$

in Eq. (16), $b'_i$ represents a discrete value of $B_i$, and n represents a maximum of possible discrete values of $B_i$; $b'_j$ represents a discrete value of $B_j$, and h represents a maximum of the discrete value of $B_j$; c represents a value of a class node C, and $p(b'_i, b'_j, c)$ represents a joint probability when $B_i=b'_i$, $B_j=b'_j$, $C=c$; $p(b'_i, b'_j \mid c)$ $p(b'_i \mid c)$ and $p(b'_j \mid c)$ are corresponding conditional probabilities, whose calculation methods are: $p(b'_i, b'_j, c)$ equals the number of records in the discrete long time feature training set when $B_i=b'_i$, $B_j=b'_j$, $C=c$, divided by the total number of records in discrete long time feature training sets; $p(b'_i, b'_j \mid c)$ equals the number of records in the discrete long time feature training set when $B_i=b'_i$, $B_j=b'_j$, $C=c$, divided by the number of records $C=c$ in the discrete long time feature training set; calculation of $p(b'_i \mid c)$ and $p(b'_j \mid c)$ is similar to that of $p(b'_i, b'_j \mid c)$;

Step 3323, initialization: defining a set $S1=\emptyset$, and a set $S2=\{B_1, B_2, \ldots, B_6\}$ wherein one of the feature attribute node $B_j(j=1, 2, \ldots, 6)$ in S2 is chosen to make $I(B_j; C)$ achieve a maximum value thereof; then an arc is added from the class node C to $B_j$, that is, the node C is taken as a parent node of $B_j$; and Step 3324, choosing one long time feature attribute node $B_j$ in S2 to make the $I(B_j; C)$ get to the maximum value; wherein then the arc is added from C to $B_j$; setting k=min (|S1|,2), choosing top k long time feature attribute nodes in S1 to make $I(B_i; B_j|C)$ get to a maximum; then k arcs are added from node $B_i$ to node $B_j$ in the network, and the long time feature attribute node $B_j$ is added to S1, and $B_j$ is deleted from S2; the above operation is cycled from choice of $B_j$ in S2 until the set S1 include all long time feature attribute nodes;

when determining the Bayesian network topology, the $B_6$ is deleted from the set S2 first, and added to the set S1; remaining nodes in the set S2 are $\{B_1, B_2, B_3, B_4, B_5\}$; in a new set S2, $B_2$ and the class node C have biggest mutual information, and k=min(|S1|, 2)=1, then k nodes are selected in S1 as the parent nodes of $B_2$, which makes $I(B_i; B_2|C)$ the largest; it also means $B_6$ is the parent node of $B_2$, then $B_2$ is deleted from the set S2, and add to the set S1; meanwhile, S2=$\{B_1, B_3, B_4, B_5\}$, and S1=$\{B_2, B_6\}$; then in the new set S2, $B_5$ and the class node C have biggest mutual information, and k=2, then we choose k nodes in S1 as parent nodes of $B_5$, which makes $I(B_i; B_2|C)$ the largest; then $B_5$ is deleted from the set S2, and added to the set S1; the above operation is cycled until the set S2 is empty.

The step 3.3 comprises steps of:

according to a posterior probability definition, a probability $PS_1$ that the event is a real abnormal event and a probability $PS_2$ that it is an environmental interference event when the value of long time feature takes a current value, are calculated respectively:

$$PS_1 = \frac{p(c=1)p(b'_1, \ldots, b'_6 \mid c=1)}{p(b'_1, \ldots, b'_6)} \propto p(c=1)\prod_{i=1}^{6} p(b'_i \mid pa_i, c=1); \quad (17)$$

$$PS_2 = \frac{p(c=2)p(b'_1, \ldots, b'_6 \mid c=2)}{p(b'_1, \ldots, b'_6)} \propto p(c=2)\prod_{i=1}^{6} p(b'_i \mid pa_i, c=2); \quad (18)$$

in Eq. (17), p(c=1) denotes a probability when an event category is the real abnormal event, which is a priori probability value; and p($b'_1, \ldots, b'_6$|c=1) is a conditional probability, indicating a probability that the long time feature takes the current value under a condition when the event category is the real abnormal event; and p($b'_1, \ldots, b'_6$) indicates a probability when the long time feature takes the current value; and p($b'_i$|$pa_i$, c=1) represents a probability when the discrete value of the long time feature attribute node $B_i$ is $b'_i$, under a condition that the discrete value of the parent node of the long time feature attribute node $B_i$ is $pa_i$ and the category is the real abnormal event; physical meaning of each symbol in Eq. (18) is similar to that of Eq. (17); Eq. (17) is computed for a posterior probability of the real anomaly event, and Eq. (18) is for a posterior probability of the environmental disturbance event; since a value of p($b'_1, \ldots, b'_6$) of $PS_1$ and $PS_2$ in an actual calculation process is the same, computation of p($b'_1, \ldots, b'_6$|c=1) is equivalent to that of $$\prod_{i=1}^{6} p(b'_i \mid pa_i, c=1),$$

wherein p($b'_i$|$pa_i$, c=1) is a parameter obtained in the training process; then computation of $PS_1$ and $PS_2$ is equivalent to $PS'_1$ and $PS'_2$ respectively:

$$PS'_1 = p(c=1)\prod_{i=1}^{6} p(b'_i \mid pa_i, c=1); \quad (19)$$

$$PS'_2 = p(c=2)\prod_{i=1}^{6} p(b'_i \mid pa_i, c=2); \quad (20)$$

wherein the event category is thus determined according to the calculated posterior probability values as shown in Eq. (19) and (20); for example, if the posterior probability at a spatial point is calculated as $PS'_1 > PS'_2$, the abnormal event is judged as a true abnormal event with probability $PS'_1$, and a classification type thereof is class=1; otherwise, it is judged as an environmental interference event with the probability $PS'_2$, and a classification type thereof is class=2.

In summary, the advantageous effects of the present invention are as follows due to the application of the technical solutions which are described above.

1. In the present invention, the distributed Bayesian identification and classification network is constructed with the consideration of the difference between the background environments at each spatial point, and the distributed identification and classification at the different spatial points are realized. Thus the correct detection rate of the whole system is improved for wide monitoring range, under the complex environmental conditions that the amplitude of the signal is unevenly distributed at each point along the whole line and the buried environments in various sections are inconsistent and so on. Besides, the false alarm rate can thus be reduced.

2. The present invention includes a typical fully distributed optical fiber sensing system, of single-ended detection, whose monitoring range of the system can extend up to tens of kilometers, and the system cost for wide range monitoring is low; besides, optical fiber sensor is passive at the front end, which can thus not be affected by the environmental factors such as weather, climate and light. And it also has high perception efficiency and longer life than the electrical sensor network.

3. The present invention can directly take a spare core of the communication cable already laid along the pipelines to carry out long distance single-end detection, thus it has advantages of convenient construction and simple maintenance.

4. The detection results of the present invention can be pinpointed based on the optical time domain reflection principle, and the system also has the ability to detect, identify and locate anomalies at multiple points simultaneously.

(a) an accumulation and preprocessing flow of the distributed optical fiber sensing signal;

(b) a spatio-temporal response graph of the anomalous events after accumulation and preprocessing.

Figure 4:
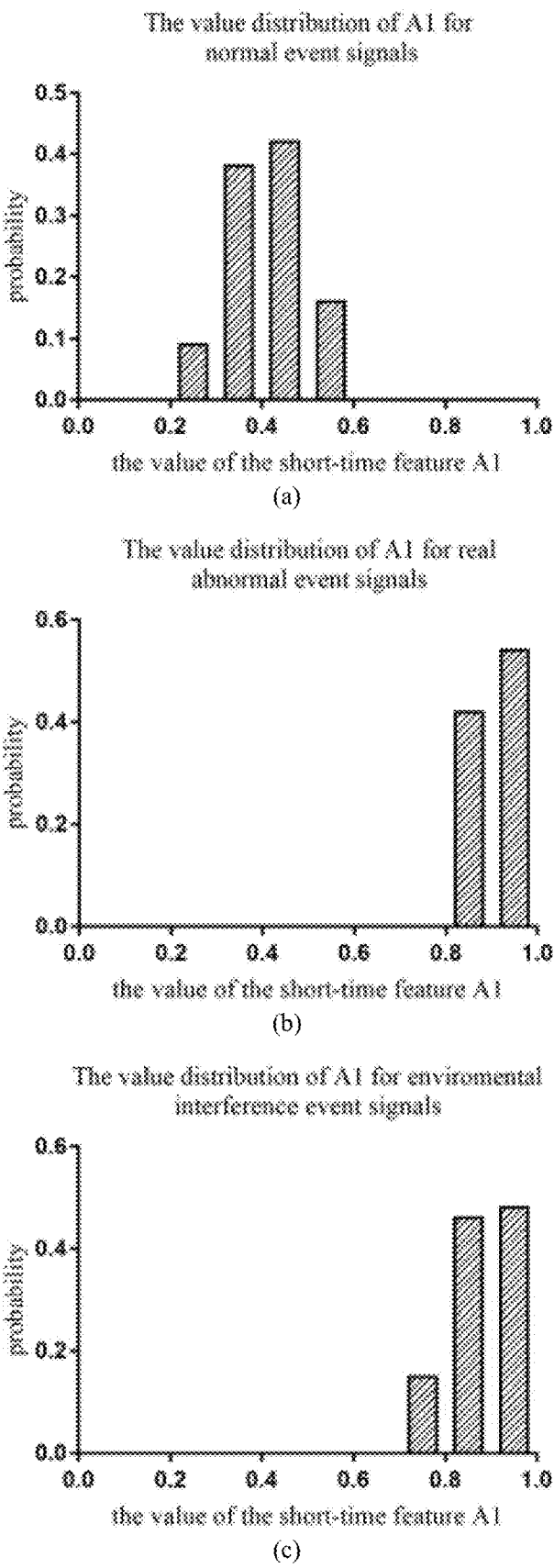

FIG. 4 is a probability distribution of the feature values of the three typical events in the present invention;

(a) normal events;

(b) real abnormal events; and (c) environmental disturbance events.

Figure 5:
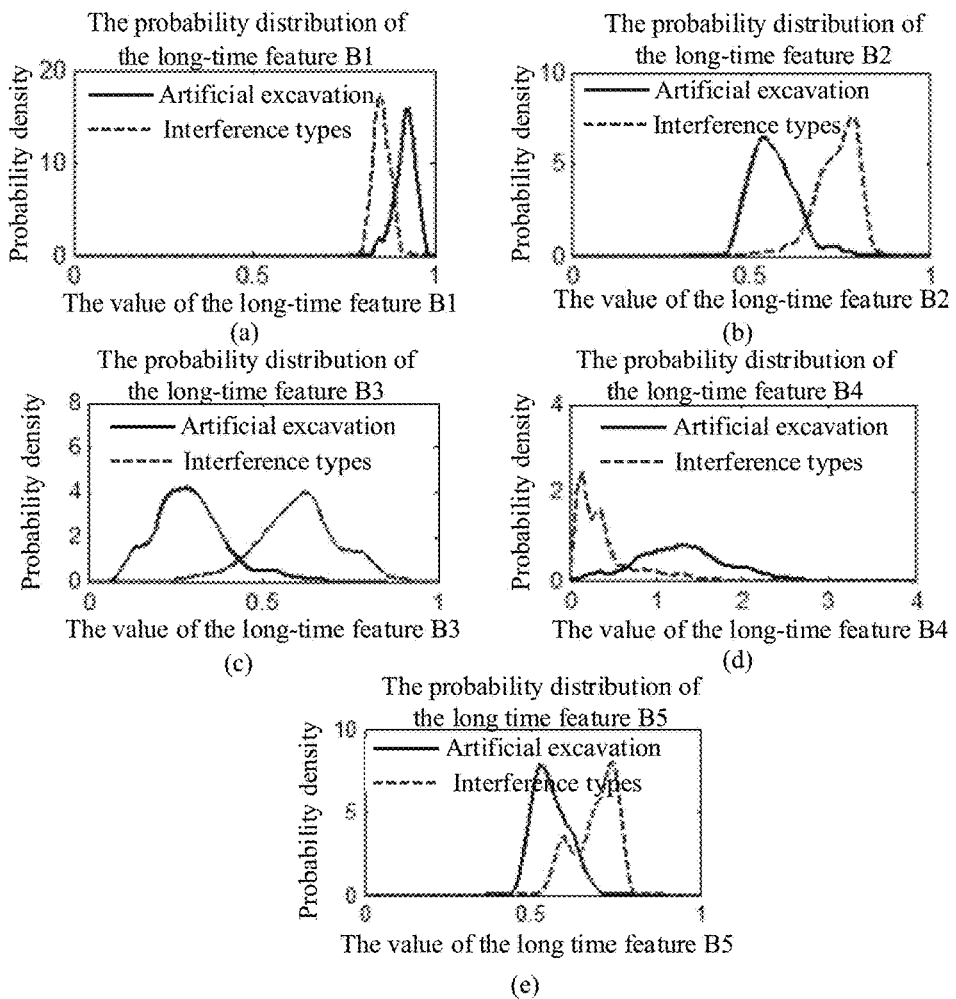

FIG. 5 is a probability distribution of the long time features $B_1, B_2, B_3, B_4, B_5$ of the long time signal at a certain spatial point in the present invention;

(a) the probability distribution of $B_1$;

(b) the probability distribution of $B_2$;

(c) the probability distribution of $B_3$;

(d) the probability distribution of $B_4$;

(e) the probability distribution of $B_5$.

Figure 6:
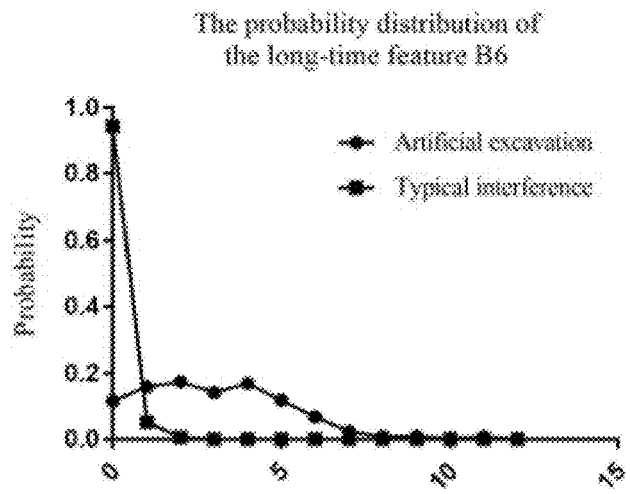

FIG. 6 is a probability distribution of the long time feature $B_6$ of the long time signal at a certain spatial point in the present invention.

Figure 7:
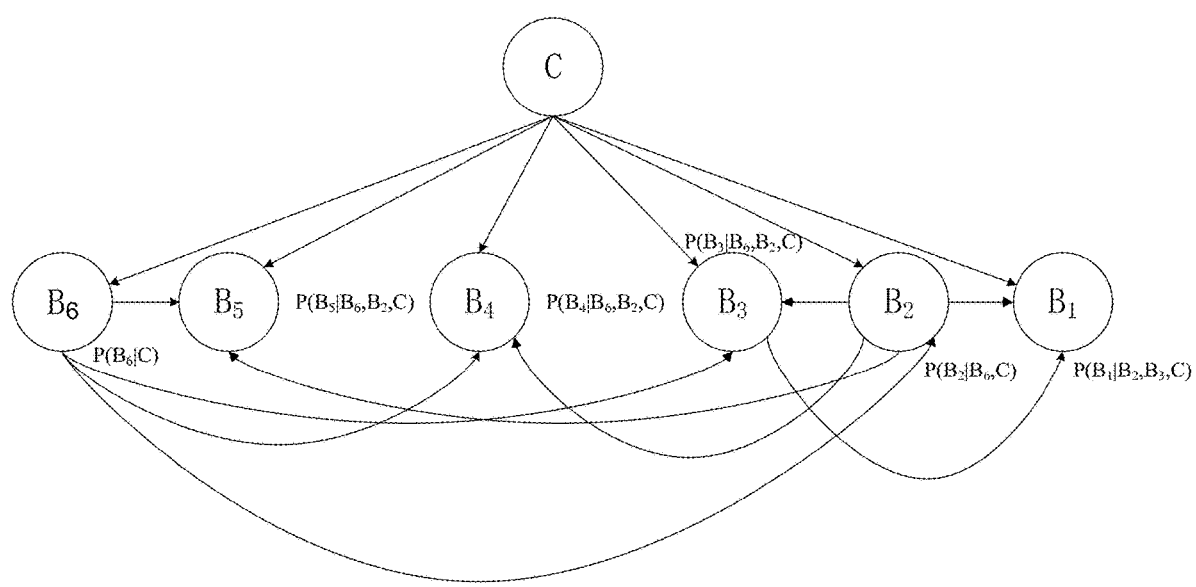

FIG. 7 is a Bayesian identification classification network constructed at a certain spatial point in the present invention.

DETAILED DESCRIPTION OF THE PREFERRED EMBODIMENT

In order to make the purpose, technical scheme and advantages of this invention more clearly understood, the following description will be combined with drawings and implementation examples to further elaborate the present invention. It is to be understood that the specific embodiments described herein are merely illustration of the present invention and not intended to limit the present invention.

Figure 1:
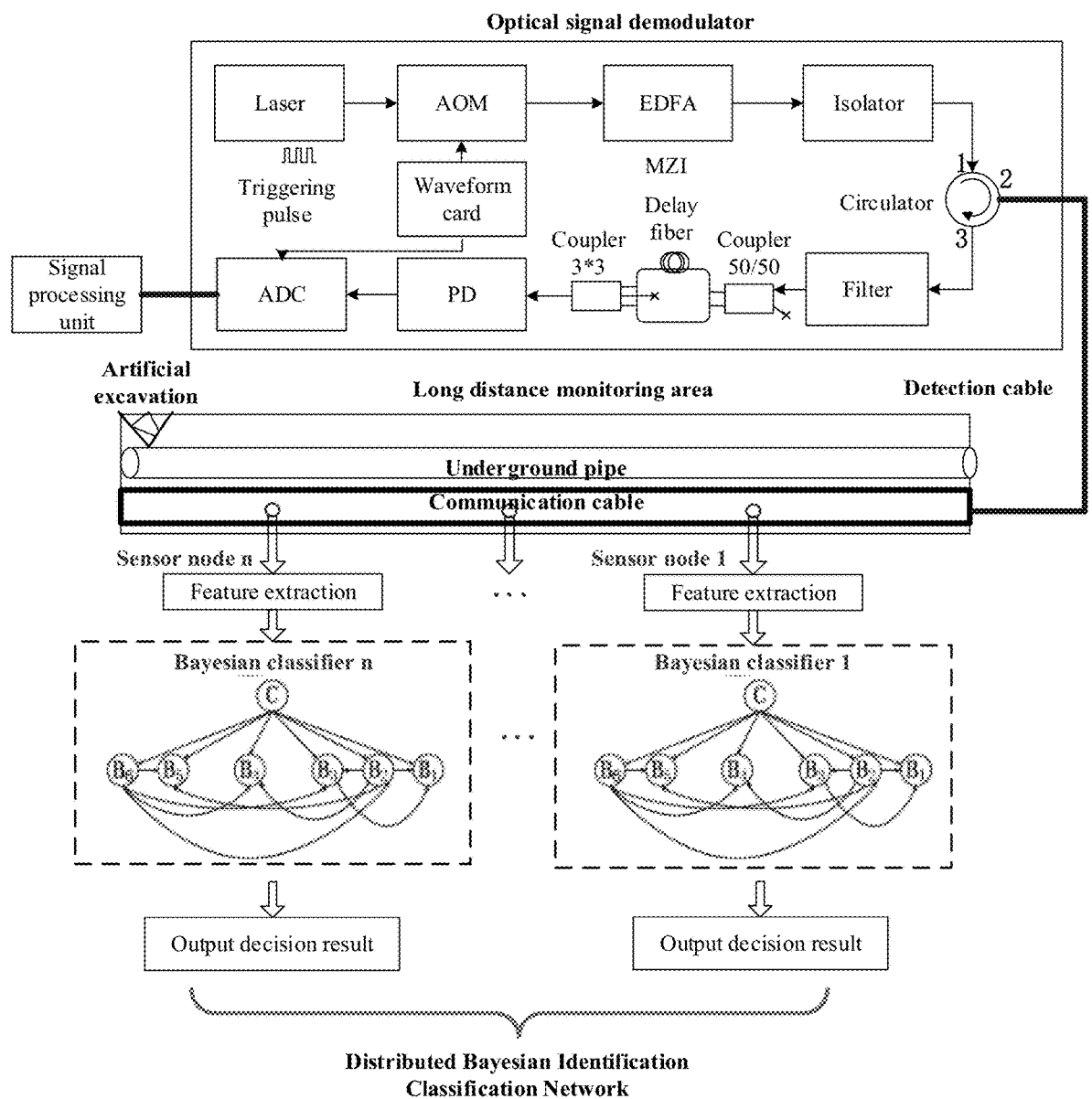
FIG. 1 is a schematic diagram of a system configuration and method flow of the present invention.

According to a first preferred embodiment of the present invention, the structure diagram and the sensing principle of the distributed optical fiber sensing signal processing method for safety monitoring of the underground pipe network are shown in FIG. 1. The hardware of the distributed optical fiber sound/vibration sensing system based on linear demodulation phase-sensitive OTDR (O-OTDR) technology mainly consists of three parts, an optical detection fiber, an optical signal demodulator, and a signal processing host. The optical detection fiber usually uses ordinary single-mode communication optical fiber. It is generally buried along the underground pipelines, transmission cables, or the urban roads, and it can also directly take a spare core of the communication cable already laid along the pipelines or the urban roads. The optical signal demodulator is the core of the system. Its internal components include optical devices and electrical devices. A continuous coherent optical signal produced by the ultra-narrow linewidth lasers is modulated into optical pulse signal by acousto-optic or electro-optical modulator (AOM/EOM). The optical pulse signal is amplified by the erbium-doped fiber amplifier (EDFA), and the amplified light pulse signal is then injected into the detection fiber through the isolator, the port 1, port 2 of the circulator; The optical pulse signal generates Rayleigh scattering along the transmission in the fiber, and the backward Rayleigh scattering signal returns along the fiber, which is received by the port 2, port 3 of the circulator. The noise signal is filtered by the filter and coupled by the first coupler and then injected into a non-balanced Mach-Zehnder or Michelson interferometer, etc., as is determined by a specific demodulation method. Three demodulated phase signals with a difference of 120 degrees are output via a 3*3 second coupler. The phase changes introduced by the external disturbances demonstrate the force, the sound waves and vibration operating on the fiber. The demodulated optical signals are transformed into electrical signals by the photoelectric detector. The signal is acquired by the analog-to-digital converter synchronously triggered and controlled by the waveform generation card. Finally, the digital signals are transmitted to the signal processing host through the network interface at real time. The signal processing host is generally the ordinary computer host (PC) or FPGA/DSP embedded motherboard for fiber sensing signal analysis and processing. The event information inducing by the sound waves or vibration can be obtained by a specific signal processing algorithm, and intelligently identified and classified, and its location can be determined from the optical time domain reflection principle.

Distributed optical fiber sensing signal processing method for the underground pipe network safety monitoring is detailed as follows. The optical detection fiber itself is equivalent to a series of sensor nodes evenly distributed along the fiber, and each sensor node corresponds to a data collection node in each spatial point. These distributed spatial sensor nodes or the acquisition nodes cooperates to pick up the sound or vibration signals on the whole line and extract distinguishable features of different sound and vibration signals. The features mainly denote the particularly defined short time features and long time feature extraction based on the relative amounts of signals in the present invention. Combined with a priori knowledge of the event occurring probability in different background environment of each spatial point, a distributed Bayesian identification classification network is constructed. Finally, the distributed detection, identification and classification of the abnormal events are carried out by the constructed Bayesian identification classification network, based on the short time and long time features extracted from the sensing signal at each spatial point. Specifically, the short time feature extraction method for the acquired sound or vibration signal in the whole monitoring range is the same as the method in constructing the Bayesian identification and classification network.

Figure 2:
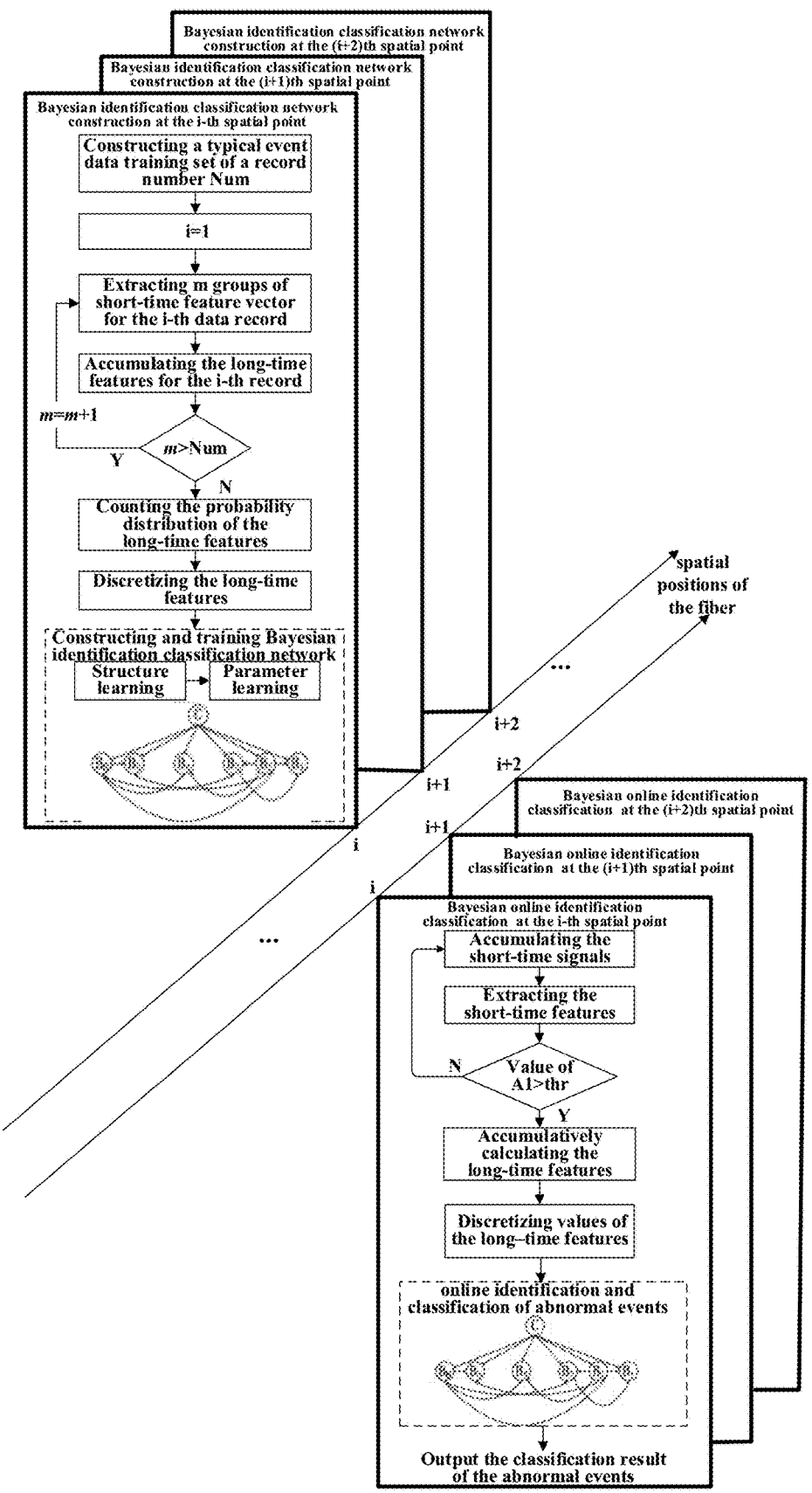
FIG. 2 is a distributed optical fiber sensing signal processing flow based on Bayesian identification classification network in the present invention.

According to a second preferred embodiment of the present invention, the distributed optical fiber sensor signal processing flow based on the distributed Bayesian identification classification network is shown in FIG. 2, which is divided into two parts:

In the first part, the Bayesian identification and classification network at each spatial point is constructed based on the training database. Firstly, the sound/vibration sensing signals are accumulated and preprocessed. The typical event data training set is constructed from the preprocessed long time signal. The short time feature is extracted based on the relative quantity of the signal for the typical event data training set, and the long time feature is calculated by the extracted short time feature. After discretization, based on the probability distribution information of the long time feature of the discrete long time feature training set, combined with the prior probability information of the background environment at each point, the Bayesian identification network topology is constructed and the parameters are learned. Then the trained Bayesian identification classification network is obtained.

In the second part, online detection, identification and classification are carried out based on the on-site event signal: Given a judgment threshold, the short time feature based on the relative quantity of the signal is used to detect the abnormal sound or vibration signal at each point. If any abnormal event is detected at a spatial point, the long time features can be cumulatively calculated from the short time features when the abnormal events occur at the point. The cumulative calculation result will be discretely processed. After the discretization, the result will be input into the constructed distributed Bayesian identification classification network for online identification and classification of the field event signal.

Figure 3:
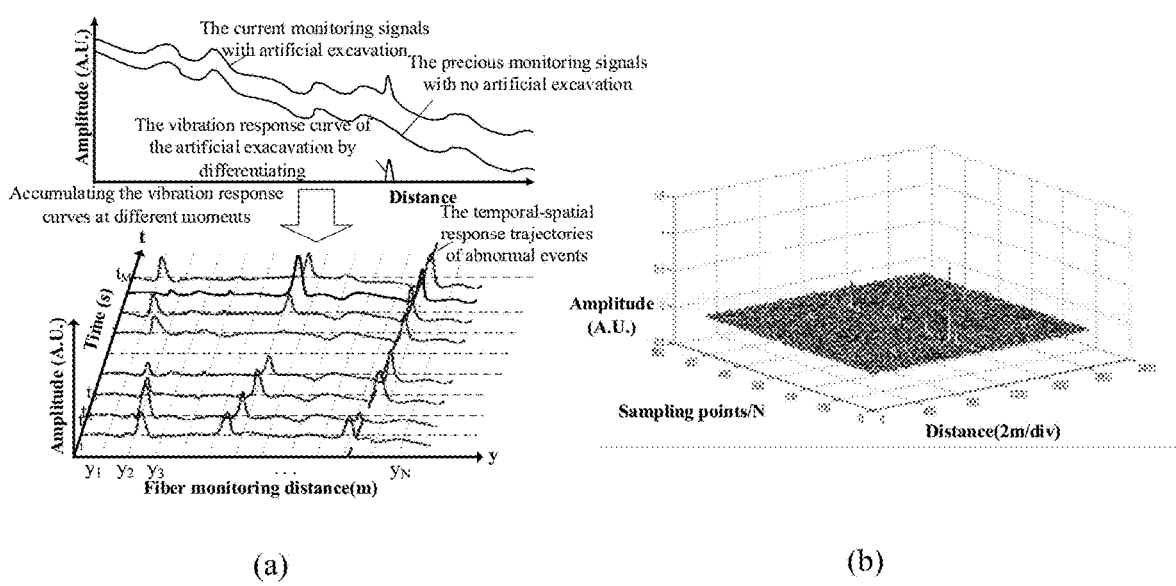
FIG. 3 is the accumulation and preprocessing of the distributed optical fiber sensing signal in the present invention.

According to a third preferred embodiment of the present invention, the sound/vibration sensing signal accumulation and preprocessing process at each spatial point is shown in FIG. 3 (a). The optical signal demodulator takes a trigger pulse as a signal acquisition period. The signal collected in this time unit is normally an exponentially decaying OTDR trajectory along the fiber. Assume the signal collected in the entire monitoring range at the k th trigger pulse period as:

$$X_k=\{x_{ki}(i=1,2,\ldots,N)\}=[x_{k1},x_{k2},\ldots,x_{kN}] \quad (1);$$

In Eq. (1), i represents the spatial index, N is the total number of data collected in the entire monitoring range, which can be seen as N spatial sensor nodes. With the light pulse triggered periodically, the original OTDR trajectory collected in each light pulse trigger period along the time axis is accumulated. After continuous accumulation of T collected original OTDR trajectories, a temporal-spatial signal response matrix with N spatial dimensions and T temporal dimensions is constructed, $$XX=\{x_{ki}(k=1,2,\ldots,T;i=1,2,\ldots,N)\} \quad (2);$$

T is the T th trigger pulse period. The graphic display of the temporal-spatial response matrix XX is shown in FIG. 3 (b), that is, the temporal-spatial response graph of the anomalous event obtained after the accumulation and preprocessing of the distributed optical fiber sensor signal. In the embodiment of the present invention, the short time feature extraction and the long time feature accumulative calculation based on the relative amount of the signal are performed for each record in the typical event data training set. The accumulation time of the short time and the long time signals are 1 s and 30 s respectively. The short time signal accumulated in the i th spatial point or sampling node is defined as:

$$w_i=\{x_{ki},k=1,2,\ldots,M\} \quad (3);$$

In the embodiment of the present invention, M is the number of data points accumulated for 1 s on the time axis. As the cycle trigger frequency is 508 Hz, the number of data points accumulated M is 508 within 1 s. m short time signals can be accumulated on the time axis and constitute a long time signal at each spatial point, $$W_i=\{x_{ki}(k=1,2,\ldots,L)\}$$

$$L=m\times M\ m\geq 1 \quad (4);$$

wherein L is the data length of the long time signal, m is a positive integer. In the embodiment of the present invention, the cumulative length of the long time signal is 30 seconds, so m is 30.

According to a forth preferred embodiment of the present invention, the typical event data training set is constructed based on the accumulated long time signal of the typical event at each spatial point. The operation process is detailed as follows. The long time signals with the length of L at each spatial point are accumulated and labeled as the event tag according to the types of events that actually occurs. During the underground pipe network safety monitoring process, the typical events at each spatial point include: the stationary environmental noise without abnormal events, artificial excavation, the traffic and factory interference which are easy to misjudge. In the present embodiment, the stationary environmental noise is the normal event and the event tag is set as 0; all the events such as artificial excavation, traffic and factory interference are referred as abnormal events, where the artificial excavation is a real anomaly event and the event tag is set as 1, while traffic and factory disturbances are environmental interferences and the event label is set as 2. Long time signals are added to the database according to the event tags to complete the three types of typical event data training set building.

According to a fifth preferred embodiment of the present invention, each record of the typical event data training set is subjected to the short time feature extraction and the long time feature accumulative calculation based on the relative quantity of the signal in the present invention, and the typical event data training set is transformed into the corresponding long time feature training set, which is detailed as follows:

1. The Short Time Feature Extraction Method of Short Time Signal

In order to avoid the influence on the detection and recognition caused by the fiber-sensing signal amplitude unevenness at different locations in a wide-range monitoring, the relative quantity features are extracted in the present invention. For the short time signal of is, four customized short time features based on the relative quantity of the signals are extracted: primary impulse intensity feature, $A_1$, secondary impulse intensity feature, $A_2$, primary and secondary impulse amplitude ratio feature, $A_3$ and wavelet packet energy spectrum feature $A_4$. Among them, the primary impulse intensity feature $A_1$ extracts the maximum impulse features of the signal; the secondary impulse intensity feature $A_2$ extracts the impulse features of the residual signal after removing the maximum impulse part of the signal; primary and secondary impulse amplitude ratio feature $A_3$ extracts impulse amplitude ratio of the maximum impulse part and the residual signal after removing the maximum impulse part of the signal; the wavelet packet energy spectrum feature $A_4$ extracts the energy spectrum feature of the important frequency band of the impulse signal.

(1) The Extraction Method of the Primary Impulse Intensity Feature $A_1$

Generally, normal events are usually stationary random noise signals, and typical abnormal event signals are usually accompanied by great vibration shocks. The first short time feature extracted in the present invention is the primary impulse intensity feature $A_1$. The short time signal $w_i$ is taken as the processing object for the short time feature extraction. First, histogram statistics is carried out for the short time signal amplitude values. The amplitude range of the short time signal w is divided into 10 consecutive intervals. $\max(w_i)$ represents the maximum value of $w_i$, $\min(w_i)$ represents the minimum value of $w_i$, and each interval is recorded as $s_l(l=1, 2, \ldots, 10)$, that is:

$$s_l=[(l-1) \times \text{averagelength} + \min(w_i), l \times \text{averagelength} + \min(w_i)], (l=1,2,\ldots,10) \quad (5);$$

In Eq. (5), averagelength is the width of each interval, that is:

$$\text{averlength} = \frac{\max(w_i) - \min(w_i)}{10}; \quad (6)$$

Calculate the corresponding sampling point number distributed in each interval for the short time period signal $w_i$ respectively and generate a frequency distribution histogram, namely compute the percentage of each interval, percent:

$$\begin{cases} \text{percent} = \{\text{percent}_l, l = 1, 2, \ldots, 10\} \\ \text{percent}_l = \frac{n_l}{M} \end{cases} \quad (7)$$

In Eq. (7), $n_l$ is the sampling point number of the short time signal, whose amplitudes range in $s_l$, M is the data length of the short time signal. Assuming that the maximum of $\text{percent}_l (l \in [1,10])$ is got at l=q, where q is the amplitude interval corresponding to the highest point of the histogram, the primary impulse intensity feature $A_1$ is computed as:

$$A_1 = \begin{cases} p_q + p_{q+1}(q \in [2, 9], p_{q-1} \leq p_{q+1}) \\ p_q + p_{q-1}(q \in [2, 9], p_{q-1} > p_{q+1}) \\ p_q + p_{q+1}(q = 1) \\ p_q + p_{q-1}(q = 10) \end{cases} \quad (8)$$

For the stationary ambient noise i.e. the short time signal of the normal event, the horizontal amplitude distribution interval is small, and the sampling point number, i.e. the height of the histogram difference is not obvious in each interval. At this time, the calculated value of $A_1$ is very small. While the horizontal amplitude distribution interval will be abruptly increased for the short time signal of the abnormal event, simultaneously, the absolute amplitude value of most sampling points is small, and most of the sampling points are centralized in the two smaller amplitude distribution intervals in the middle. At this time, the calculated value of $A_1$ is larger. So it can be used as the first short time distinguishable feature in the extraction operation, which is denoted as the primary impulse intensity feature. As shown in FIG. 4, there is a significant difference in the probability distributions of the value of the primary impulse intensity feature $A_1$ for the three typical events. The value of $A_1$ for the normal event signal in FIG. 4 (a) is small and the distribution center is near 0.4, while the value of $A_1$ for the real anomaly events in FIG. 4 (b) and that for the environmental interference events in FIG. 4 (c) are both large and the distribution centers are near 0.9.

(2) The Extraction Method of Secondary Impulse Intensity Feature $A_2$

As shown in FIG. 4, two types of abnormal events, such as real anomaly events and environmental disturbances, usually have a large primary impulse intensity, and thus we continue to extract a second short time feature, the secondary impulse intensity feature $A_2$. Based on the data analysis, the short time signal of real abnormal events, i.e. artificial excavation, generally only have a large impulse intensity. After the impulse is removed, the remaining short time signal is close to the stationary environmental noise; while the short time signal of traffic interference and other environmental interference events is normally accompanied by several impulses with different intensity due to uneven road or stone shocks. After the primary impulse is removed, the remaining signal still contains more than one impulse. The extraction method of the secondary impulse intensity feature $A_2$ is detailed as follows: assuming that the absolute maximum value of the short time signal $w_i = \{x_{ki}, k=1, 2, \ldots, M\}$ is obtained at k=t, where t is the time when the absolute value of the short time signal is max. Remove M/4 sampling points near k=t from $w_i$ to obtain the remaining 3M/4 sampling points, which constitute the time sequence $w'_i$, where M is the short period of signal length:

$$w'_i = \begin{cases} x_{ki}\left(\begin{array}{l} k = 1, 2, \ldots, t - \frac{M}{8}, \\ t + \frac{M}{8}, t + \frac{M}{8} + 1, \ldots, M \end{array}\right)\left(\frac{M}{8} < t < \frac{7M}{8}\right) \\ x_{ki}\left(k = \frac{M}{4} + 1, \frac{M}{4} + 2, \ldots, M\right)\left(t \leq \frac{M}{8}\right) \\ x_k\left(k = 1, 2, \ldots, \frac{3M}{4}\right)\left(t \geq \frac{7M}{8}\right) \end{cases} \quad (9)$$

Finally, the secondary impulse intensity feature $A_2$ is extracted for $w_i$, by the same method as that of extracting the primary impulse feature $A_1$, as shown in Eq. (5), (6), (7) and (8). In general, the value of the secondary impulse intensity feature $A_2$ is small for the short time signal of the artificial excavation event, while that for the short time signal of the traffic and factory disturbance event is larger.

(3) The Extraction Method of the Primary and Secondary Impulse Amplitude Ratio Feature $A_3$ Due to the fact that the short time signal of real abnormal event after the primary impulse is removed is similar to the stationary noise, its amplitude is very small compared with the maximum impulse amplitude. While the short time signal of the traffic and factory interference events after the primary impulse is removed have several impulses with different intensity, whose amplitudes are always large compared with the primary impulse amplitude. Therefore, the calculation method of the primary and secondary impulse amplitude ratio feature $A_3$ as a third short time feature, is:

$$A_3 = \frac{\max(|w'_i|)}{\max(|w_i|)}; \qquad (10)$$

In Eq. (10), $\max(|w'_i|)$ represents the maximum absolute value of the amplitude of the time series signal $w'_i$; $\max(|w_i|)$ represents the maximum absolute value of the amplitude of the time series signal $w_i$.

(4) The Extraction Method of Wavelet Packet Energy Spectrum Feature $A_4$

In general, the low- and middle-frequency information is relatively rich in the instantaneous impulses for real abnormal events; while low-frequency information is rich in that of the traffic and factories or other environmental interference events. Based on this point, a three-layer db6 wavelet packet decomposition is carried out on the short time signal $w_i$. We sort the decomposed sub-bands from low to high according to the frequency component, which is marked as $s_0 \sim s_7$. Finally, the wavelet packet coefficient energy of each frequency band is calculated to form the wavelet packet coefficient energy feature vector $E_{wp}=[E_0, E_1, \ldots, E_7]$. The wavelet packet energy spectrum feature $A_4$ is obtained as:

$$A_4 = \frac{E_2 + E_3}{E_0 + E_1}; \qquad (11)$$

In Eq. (11), $E_2$, $E_3$ represents the energy of the medium and low frequency sub-bands, $E_0$, $E_1$ represents the energy of the low frequency sub-bands. The low- and medium-frequency information of the short time signal is rich for real-time event, and the value of $A_4$ is large, while the low-frequency information of the short time signal is rich for the traffic and factory interferences or other environmental events, and its value of $A_4$ is generally small.

2. The Cumulative Calculation Method of Long Time Feature of Long Time Signal

Short time signal is a local observation of the event and the event classification based on the short time features always cannot obtain a high identification accuracy. So after extraction of the short time features, we continue to accumulate a long time signal and extract its features to observe the event for a longer time, to get an accurate identification based on the rich event information. In the present invention, there are six customized long time features for the accumulated long time signals, including the long time primary impulse intensity feature $B_1$, the long time secondary impulse intensity feature $B_2$, the long time amplitude ratio feature $B_3$, the long time wavelet packet energy spectrum feature $B_4$, long time environmental background feature $B_5$ and long time strict impulse number feature $B_6$, and all of them are obtained from the cumulative calculation result based on the extracted customized short time features, where the long time primary impulse intensity feature $B_1$ represents the average of the primary impulse intensities of all the short time signals of the abnormal events during the accumulation time period; the long time secondary impulse intensity feature $B_2$ represents the average of the secondary impulse intensities of all the short time signals of the abnormal events during the accumulation time period; the long time amplitude ratio feature $B_3$ represents the average of the amplitude ratio feature of all the short time signals of the abnormal events during the accumulation time period; the long time wavelet packet energy spectrum feature $B_4$ represents the average of the wavelet packet energy spectrum feature of all the short time signals of the abnormal events during the accumulation time period; the long time environmental background feature $B_5$ represents the background fluctuation of the long time signal; the long time strict impulse number feature $B_6$ represents the detected number of strict impulses within long time signal. The long time features of the long time signal don't need to be re-extracted. They can be obtained by accumulating or averagely calculating of m short time features corresponding to the long time signal, and the detailed steps are:

(a) initialization

Set the variable t=1; denote the set $T_1=\emptyset$, $T_2=\emptyset$, $T_3=\emptyset$, $T_4=\emptyset$, $T_5=\emptyset$, $T_6=\emptyset$; and consider the long time signal as m short time signal $w_{i,t}$ (t=1, 2, ..., m), where $w_{i,t}$ represents the t th short time signal.

$$B_1=\text{average}(T1), B_2=\text{average}(T2), B_3=\text{average}(T3),$$
$$B_4=\text{average}(T4) \qquad (12);$$

(b) Repeat the Following Operations Until t=m

The values of the short time features $A_1$, $A_2$, $A_3$, $A_4$ of the short time signal are denoted as a1, a2, a3, a4 respectively. Observe the four types of short time feature of m short time signals within the window according to the long time signal and put the feature values in different sets T1, T2, T3, T4, T5, T6 respectively, which is aimed to prepare for the extraction of six long time features. For example, if a1>thr, the short time signal is judged to be an abnormal event, a1, a2, a3, a4 will be added to the sets T1, T2, T3, T4 respectively; if a1<thr, the short time signal is judged to be a normal event, a1 will be added to the set T5; if a1>thr and a2<thr1, a3<thr2, which meets the strict impulse conditions, a1 will be put into the set T6. thr, thr1, thr2 are the empirical threshold to judge the impulse intensity strong or weak respectively. When the m short time feature values of the short time signal are all placed in the set T1, T2, T3, T4, T5, T6, the six long time feature values of the long time signal are calculated. Among them, averaging the short time feature values in the set T1, T2, T3, T4 can obtain the value of $B_1$, $B_2$, $B_3$, $B_4$ in turn.

The set T5 contains a1 of all normal events during long time period. Generally, the artificial excavation and other real abnormal events appear intermittently, and the short time signal nearby is relatively stationary, thus the values of a1 are always small; while traffic vehicles, factory interference and other environmental interference events are more complex, and the short time signal nearby also contains more small fluctuations, thus the values of a1 are always larger. In the end, all the a1 values in the set T5 are averaged, and the background fluctuation of the long time signal can be obtained. Therefore, the long-term environmental background feature $B_5$ is calculated as:

$$B_5=\text{average}(T5) \qquad (13).$$

Generally, the impulse of the environmental interference event signal and that of the real abnormal event signal is significantly different. In order to minimize the false alarms induced by the environmental interference, strictly selection and exclusion for the impulse signal generated by environmental interference events is needed. Then we take the strict impulse number feature $B_6$ as one of the criterion for the abnormal event determination. The impulse simply judged by the single empirical threshold thr actually contain two categories, pseudo-impulse and strict impulse; Then another two empirical threshold thr1 and thr2 can be added to select the strict impulses, which can be used to exclude the pseudo-impulses and detect the real abnormal events. Specifically, when the value of the short time primary impulse intensity feature $A_1$ satisfies a1>thr, if and only if the value of the short time secondary impulse intensity feature $A_2$ satisfies a2<thr1, and when the short time amplitude ratio feature $A_3$ satisfies a3<thr2, it is then judged that the short time signal $w_{i,t}$ is a strict impulse signal; wherein the selection criteria of the empirical threshold thr1 and thr2 are determined by the training signals in the training event database. In the present embodiment, when the real abnormal event signal caused by artificial excavation is processed by the thresholds thr, thr1 and thr2, it is judged to be a strict impulse signal at a probability of 70% or more. After the threshold processing with thr, thr1, thr2, only 10% of environmental disturbances such as traffic and factory interference can be judged as a strict impulse signal. Finally, the number of long time impulse feature $B_6$ is calculated as:

$$B_6 = \text{length}(T6) \quad (14);$$

Eq. (14) represents the number of data in the set T6, that is, the impulse number meeting short time strict impulse conditions in the long time period.

3. Construction of the Long Time Feature Training Set Corresponding to the Typical Event Data Training Set According to the feature extraction method above, the short time feature extraction and the long time feature accumulation calculation are carried out for each data record in the typical event data training set. The long time features attached with the event type tag of the record will eventually constitute a long time feature vector corresponding to data record, which is denoted as the Train_Feature=[class, b1, b2, b3, b4, b5, b6]; where in class represents the event type tag for the record, b1,b2,b3,b4,b5,b6 are respectively the values of the long time feature $B_1$, $B_2$, $B_3$, $B_4$, $B_5$, $B_6$. Finally, the whole typical event data training set is transformed into the corresponding long time feature training set TrainingFeature.

According to a sixth preferred embodiment of the present invention, the long time feature training set of the typical event data training set is discretized, and the specific steps are as follows:

1. Discretization of Long Time Feature Attribute Value

Since the first five long time feature attribute values of the feature set $\{B_1, B_2, B_3, B_4, B_5, B_6\}$ are continuous and the value of each attribute node in the Bayesian recognition classification network should be discrete, it is necessary to discretize the long time feature attribute value first. The method comprises of the following steps: taking a certain spatial point as an example, the probability distribution of the long time feature is calculated from the continuous long time feature training set of the point, and then the interval division and discretization are carried out according to the probability distribution.

(1) Discretization of the Attribute Value of Long Time Feature $B_1$

The probability distribution of the long time feature $B_1$ of a long time signal at a certain spatial point is calculated based on the continuous long time feature training set. As shown in FIG. 5(a), the probability density of the environmental interference event is large in the interval [0.80, 0.91]; and the probability density of the real anomaly event is larger in the interval [0.92,1.0]; while the probability density of the two kinds of abnormal events is not different in the interval [0.91, 0.92]. Therefore, the discrete values of the long time feature $B_1$ in intervals (0,0.8), [0.80, 0.91], (0.91, 0.92], and (0.92,1.0] are set to 0, 1, 2, 3 respectively.

(2) Discretization of the Attribute Value of Long Time Feature $B_2$

The probability distribution of the long time feature $B_2$ of a long time signal at a certain spatial point is calculated based on the continuous long time feature training set. As shown in FIG. 5(b), the probability density of the real anomaly event is larger than that of the environmental interference event in the interval [0.63,0.68); while the probability density of the two kinds of abnormal events is not different in the interval [0,0.63); Therefore, the discrete values of the long time feature $B_2$ in intervals [0,0.63), [0.63,0.68), and [0.68,1.0] are set to 0, 1, 2.

(3) Discretization of the Attribute Value of Long Time Feature $B_3$

The probability distribution of the long time feature $B_3$ of a long time signal at a certain spatial point is calculated based on the continuous long time feature training set. As shown in FIG. 5(c), the probability density of the real anomaly event is large in the interval [0,0.32); the probability density of the environmental interference event is large in the interval [0.39,1.0]; and the probability density of the two kinds of abnormal events is not different in the interval [0.32,0.39). Therefore, the discrete values of the long time feature $B_3$ in intervals [0,0.32), [0.32,0.39), and [0.39,1.0] are set to 0, 1, 2.

(4) Discretization of the Attribute Value of Long Time Feature $B_4$

The probability distribution of the long time feature $B_4$ of a long time signal at a certain spatial point is calculated based on the continuous long time feature training set. As shown in FIG. 5(d), the probability density of the environmental interference event is large in the interval [0,0.6), the probability density of the real anomaly event is large and that of the environmental interference event is small in the interval [0.8,3.0], the probability density of the two kinds of abnormal events is not very different in the interval [0.6,0.8), Therefore, the discrete values of the long time feature of $B_4$ in intervals [0,0.6), [0.6,0.8), [0.8,3.0], and (3.0,∞) are set to 0, 1, 2, 3.

(5) Discretization of the Attribute Value of Long Time Feature $B_5$

The probability distribution of the long time feature $B_5$ of a long time signal at a certain spatial point is calculated based on the continuous long time feature training set. As shown in FIG. 5(e), the probability density of the real anomaly event is large in the interval [0,0.59), while the probability density of the environmental interference event is large in the interval [0.67,1.0], and the probability density of the two kinds of abnormal events is not different in the interval [0.59,0.67). Thus in this inventive embodiment, the discrete values of the long time feature $B_5$ in the interval [0,0.59), [0.59,0.67), [0.67,1.0] are set to 0, 1, 2, respectively.

Long time feature $B_6$ is a count number of the strict impulses of m short time signal. As the value of itself is discrete, there is no need for further discretization. The probability distribution of the long time feature $B_6$ as is shown in FIG. 6, can be used directly to construct the Bayesian identification classification network.

2. The Construction of Discrete Long Time Feature Training Set

After the feature attribute value discretization as above, the continuous long time feature training set TrainingFeature corresponding to each data record, can be transformed into the discrete long time feature training set TrainingFeature', as stated in the fifth embodiment. The discrete long time feature training set is denoted as, Train_Feature'=[class, b1', b2', b3', b4', b5', b6'], where b1', b2', b3', b4', b5', b6' are the corresponding discrete feature values of the long time feature $B_1$, $B_2$, $B_3$, $B_4$, $B_5$, $B_6$ after the discretization.

According to a seventh preferred embodiment of the present invention, the distributed Bayesian identification classification network at each spatial point (corresponding to each spatial node) is constructed, which includes Bayesian network topology and network parameter learning at that spatial point.

Taking the Bayesian identification and classification network construction process at a certain point as an example, according to the mutual information of all long time feature attribute nodes and class nodes obtained from the discrete long time feature training set at this point, and the conditional mutual information between the feature attribute nodes under the class node condition, the Bayesian network topology is constructed; and the parameters are further studied based on the constructed Bayesian network topology. On the basis of the network topology, the conditional probability of each feature attribute node is calculated, and the detailed steps are as follows:

1. The Construction of the Bayesian Network Topology Based on the Mutual Information and the Conditional Mutual Information (1) calculation of the mutual information between the long time feature attribute node and the class node The mutual information between all the long time feature attribute node $B_j$ and the class node C is calculated as follows:

$$I(B_j; C) = \sum_{b \in S_b} \sum_{c \in \{1,2\}} p(b'_j, c) \log \frac{p(b'_j, c)}{p(b'_j)p(c)} (j = 1, 2, \ldots, 6); \quad (15)$$

In Eq. (15), $S_b$ denotes a set of all the possible discrete values taken for the long time feature attribute node $B_j$(j=1, 2, . . . , 6), $p(b'_j, c)$ represents the joint probability when $B_j$=b'$_j$, C=c; $p(b'_b)$ represents the probability when $B_j$=b'$_j$; the values of $p(b'_j, c)$ and $p(b'_j)$ can be obtained from the discrete long time feature training set, and the calculation method is: $p(b_j, c)$ equals the number of records in the discrete long time feature training set when $B_j$=b'$_j$, C=c, divided by the total number of records in discrete long time feature training sets; and $p(b_j)$ equals the number of records in the discrete long time feature training set when $B_j$=b'$_j$, divided by the total number of records in discrete long time feature training sets. In the present embodiment, the mutual information $I(B_j; C)$ between all the discrete long time characteristic attribute nodes $B_j$ and the class nodes C is calculated according to the method described as above.

(2) The Calculation of Conditional Mutual Information Between Each Two of all the Feature Attribute Nodes Under the Class Node Condition According to the discrete long time feature training set, the calculation of the condition mutual information between each two feature attribute nodes $B_i$, $B_j$(i≠j, and i=1, 2, . . . , 6, j=1, 2, . . . , 6) under the condition of class node C is:

$$I(B_i; B_j | C) = \sum_{b'_i=0}^{n} \sum_{b'_j=0}^{h} \sum_{c=1}^{2} p(b'_1, b'_j, c) \log \frac{p(b'_i, b'_j | c)}{p(b'_i | c)p(b'_j | c)}, \quad (16)$$

$$(i = 1, 2, \ldots, 6, j = 1, 2, \ldots, 6; i \neq 1);$$

In Eq. (16), b'$_i$ represents the discrete value of $B_i$, and n represents the maximum of the possible discrete values of $B_i$; b'$_j$ represents the discrete value of $B_j$, and h represents the maximum of the discrete value of $B_j$; C represents the value of class node C, and $p(b'_i, b'_j, c)$ represents the joint probability when $B_i$=b'$_i$, $B_j$=b'$_j$, C=c; $p(b'_i, b'_j | c)$, $p(b'_i | c)$ and $p(b'_j | c)$ are the corresponding conditional probabilities, whose calculation methods are: $p(b'_i, b'_j, c)$ equals the number of records in the discrete long time feature training set when $B_i$=b'$_i$, $B_j$=b'$_j$, C=c, divided by the total number of records in discrete long time feature training sets; $p(b'_i, b'_j | c)$ equals the number of records in the discrete long-term feature training set when $B_i$=b'$_i$, $B_j$=b'$_j$, C=c, divided by the number of C=c records in the discrete long time feature training set; calculation of $p(b'_i|c)$ and $p(b'_j|c)$ is similar to that of $p(b'_i, b'_j|c)$. In the present embodiment, the conditional mutual information $I(B_i; B_j|C)$ between each two feature attribute nodes under the class nodes condition is calculated according to the method described as above.

(3) The Construction of Bayesian Network Topology

According to the mutual information between the long time feature attribute node and the class node, and the conditional mutual information between each two feature attribute nodes under the class node condition, the Bayesian network topology is determined as follows:

(a) Initialization

Let the set S1=∅, and the set S2={$B_1$, $B_2$, . . . , $B_6$}, one of the feature attribute node $B_j$(j=1, 2, . . . , 6) in S2 is chosen to make I($B_j$; C) achieve its maximum value of. Then an arc is added from the class node C to $B_j$, that is, the node C is taken as a parent node of $B_j$;

(b) The Bayesian Network Topology is Determined by the Repetition of the Following Operation One long time feature attribute node $B_j$ in S2 is chosen to make the I($B_j$; C) get to its maximum value. Then an arc is added from C to $B_j$; let k=min(|S1|, 2), the top k long time feature attribute nodes in S1 to make I($B_i$; $B_j$|C) get to its maximum. Then k arcs are added from node $B_i$ to node $B_j$ in the network, and the long time feature attribute node $B_j$ is added to S1, and delete $B_j$ from S2. The above operation is cycled from the choice of $B_j$ in S2 until the set S1 include all of the long time feature attribute nodes.

For example, when we determine the Bayesian network topology in this embodiment, since the mutual information between $B_6$ and the class node C is the largest, we delete the $B_6$ from set S2 first, and add it to set S1; the remaining nodes in set S2 are {$B_1$, $B_2$, $B_3$, $B_4$, $B_5$}; in the new set S2, $B_2$ and the class node C have the biggest mutual information, and k=min(|S1|,2)=1, then we select k nodes in S1 as parent nodes of $B_2$, which can make I($B_1$; $B_2$|C) the largest. It also means we make $B_6$ as the parent node of $B_2$, then we delete $B_2$ from the set S2, and add it to the set S1; at this time, S2={$B_1$, $B_3$, $B_4$, $B_5$}, and S1={$B_2$,$B_6$}. Then in the new set S2, $B_5$ and the class node C have the biggest mutual information, and k=2, then we choose k nodes in S1 as parent nodes of $B_5$, which can make I($B_1$; $B_2$|C) the largest. Then $B_5$ is deleted from the set S2, and added to the set S1; the above operation is cycled until the set S2 is empty. In the present embodiment, the Bayesian network topology is constructed as shown in FIG. 7.

2. The Learning of Bayesian Network Parameter

The network parameters is learned based on the above constructed Bayesian network topology. Specifically, the conditional probability $p(b'_i|Pa_i,c)$ (i=1, 2, . . . , 6) is calculated for each feature attribute node of the Bayesian network topology, where b'$_i$ represents the value of the long time feature attribute node $B_i$, and $Pa_i$ obtained by the training process above is the parent node of the attribute node $B_i$. The calculation method is detailed as follows:

p(b'$_i$|Pa$_i$, c) equals the number of records in the discrete long time feature training set when B$_i$=b'$_i$, Pa$_i$=pa$_i$, C=c, divided by the number of records in the discrete long time feature training set when Pa$_i$=pa$_i$, C=c, where Pa$_i$ is the value of B$_i$'s parent node Pa$_i$.

Here we just take the construction and training of the Bayesian identification classification network at one spatial point as a specific example. The Bayesian identification and classification network at all the other spatial points along the fiber can be distributedly constructed and trained as above.

According to an eighth preferred embodiment of the present invention, the detection and recognition process of an on-line anomalous event is carried out based on the distributed Bayesian identification and classification network constructed and trained for all the spatial point. Firstly, the abnormality of signal is judged from the short time feature. When an anomaly event is detected at a spatial point, its long time feature accumulation calculation and discretization process is carried out. The discretization results is then input into the constructed distributed Bayesian identification classification network, then the abnormal event can be identified and classified at this point, that is to say it can be determined whether this abnormality is a true abnormal event caused by the artificial excavation, or the environmental interference events caused by traffic, factory and other typical interference. The detailed detection process is as follows: the short time signal is accumulated for one second(s) at each spatial point along the time axis, the short time primary impulse feature A$_1$ is then extracted from a unit of short time signal for abnormal events detection. If the value of the short time feature A$_1$ is smaller than the empirical threshold thr, then the short time signal is judged as a kind of normal event. Then we can move to the next spatial point to perform similar short time feature extraction and abnormal event detection; while when A$_1$ exceeds the empirical threshold thr, it is judged that an abnormal event occurs at that spatial point.

According to a ninth preferred embodiment of the present invention, based on the Bayesian identification and classification network trained at each spatial point, the abnormal events detected in the field application can be identified and classified on line as follows: when an anomaly event is detected at a spatial point, the signal is accumulated for a period of 30 s from that moment; when the accumulation time is out, the corresponding long time feature B$_1$, B$_2$, B$_3$, B$_4$, B$_5$, B$_6$ is accumulated and calculated which is similar to the training phase; then these features are discretized, and input into the distributed Bayesian identification classification network prepared at that point, and the abnormal event is identified and classified, and the abnormal event type such as the real abnormal event, the environment interference event and etc can be output from the network. The detailed steps are as follows:

$$PS_1 = \frac{p(c=1)p(b'_1, \ldots, b'_6 | c=1)}{p(b'_1, \ldots, b'_6)} \propto p(c=1)\prod_{i=1}^{6} p(b'_i | pa_i, c=1); \quad (17)$$

$$PS_2 = \frac{p(c=2)p(b'_1, \ldots, b'_6 | c=2)}{p(b'_1, \ldots, b'_6)} \propto p(c=2)\prod_{i=1}^{6} p(b'_i | pa_i, c=2); \quad (18)$$

In Eq. (17), p(c=1) denotes the probability when the event category is a real abnormal event, which is a priori probability value; and p(b'$_1$, . . . , b'$_6$|c=1) is a conditional probability, indicating the probability that the long time feature takes the current value under the condition when the event category is a real abnormal event; and p(b'$_1$, . . . , b'$_6$) indicates the probability when the long time feature takes the current value; and p(b'$_i$|pa$_i$, c=1) represents the probability when the discrete value of the long time feature attribute node B$_i$ is b'$_i$, under the condition that the discrete value of the parent node of long time feature attribute node B$_i$ is pa$_i$ and the category is a real abnormal event. The physical meaning of each symbol in Eq. (18) is similar to that of Eq. (17). Eq. (17) is computed for the posterior probability of the real anomaly event, and Eq. (18) is for the posterior probability of the environmental disturbance event. Since the value of p(b'$_1$, . . . , b'$_6$) of PS$_1$ and PS$_2$ in actual calculation process are the same, computation of p(b'$_1$, . . . , b'$_6$) is equivalent to that of $$\prod_{i=1}^{6} p(b'_i | pa_i, c=1),$$

where p(b'$_i$|pa$_i$, c=1) is the parameter obtained in the training process. Then the computation of PS$_1$ and PS$_2$ is equivalent to PS'$_1$ and PS'$_2$ respectively:

$$PS'_1 = p(c=1)\prod_{i=1}^{6} p(b'_i | pa_i, c=1); \quad (19)$$

$$PS'_2 = p(c=2)\prod_{i=1}^{6} p(b'_i | pa_i, c=2); \quad (20)$$

The event category is thus determined according to the calculated posterior probability values as shown in Eq. (19) and (20). For example, if a posterior probability at a spatial point is calculated as PS'$_1$>PS'$_2$, the abnormal event is judged as a true abnormal event with probability PS'$_1$, and its classification type is class=1; otherwise, it is judged as an environmental interference event with probability PS'$_2$ and its classification type is class=2.

The present invention discloses a kind of distributed optical fiber sensing signal processing method for safety monitoring of underground pipe network, which is applicable not only to the distributed optical fiber acoustic/vibration sensing system based on the phase sensitive optical time domain reflection technology, but also to MZ, Micelson, Sagnac interferometer and other types of distributed optical fiber sound/vibration sensing systems. And it is also applicable to the quasi-distributed fiber optic acoustic/vibration sensing system based on grating and Febry-perot array; the short time and the long time feature extraction and discretization in this method can be adapted to the practical applications. The distributed identification network construction method according to the sensing signals of the real abnormal events and the environment interference at each spatial point can be directly applied to the safety monitoring of underground pipe network such as oil and gas pipelines, water supply pipelines, heat pipes and so on, and also applies to communication Fiber optic cables, power cables, perimeter security, structural health monitoring and other distributed optical fiber sensing applications. What is described above is provided only as a preferred embodiment of the present invention and not intended to limit the present invention, thus any modifications, equivalent substitutions and improvements within the spirit and principles of the present invention are intended to be protected by the present invention within the range.

What is claimed is:

1. A distributed optical fiber sensing signal processing method for safety monitoring of an underground pipe network, comprising steps of:
   Step 1, picking up sound or vibration signal at each point along a line of a detection cable laid within a monitoring range;
   Step 2, extracting a customized short time feature according to a relative value of the sound or the vibration signal collected in a whole monitoring area at each spatial point; and
   Step 3, detecting an abnormal event occurs or not at each spatial point according to the short time feature, wherein then a long time feature is calculated and accumulated for the signal of the abnormal event, then values of these features are discretized after calculation and accumulation, then these discrete values of features are input into a Bayesian identification and classification network which is trained for each spatial point to realize identification and classification;
   wherein in the Step 3, detailed steps of construction of the Bayesian identification and classification network which is trained for the each spatial point are:
   Step 31, accumulating the sound or the vibration signal and then preprocessing it, wherein then a typical event data training set is built based on a long time signal which is obtained from pretreatment;
   Step 32, extracting the customized short time feature from the relative value of the signal for the typical event data training set, wherein the long time feature is calculated and accumulated, after the extraction, then the typical event data training set is transformed into a long time feature training set; and
   Step 33, constructing the Bayesian identification classification network topology and learning the parameter based on the probability distribution information of the long time feature in the long time data training set and combined with prior probability information of a background environment at each spatial point, thus obtaining the trained Bayesian identification classification network;
   wherein detailed steps of the Step 32 are:
   Step 321, extracting four customized short time features based on a relative quantity of the signals from the short time signal: a primary impulse intensity feature $A_1$, a secondary impulse intensity feature $A_2$, a primary and secondary impulse amplitude ratio feature $A_3$, and a wavelet packet energy spectrum feature $A_4$;
   Step 322, calculating and accumulating the short time features to get six customized long time features, which include a long time primary impulse intensity feature $B_1$, a long time secondary impulse intensity feature $B_2$, a long time amplitude ratio feature $B_3$, a long time wavelet packet energy spectrum feature $B_4$, a long time environmental background feature $B_5$ and a long time strict impulse number feature $B_6$; and
   Step 323, according to the long time features and corresponding event type tags thereof, transforming the typical event data training set into the long time feature training set.

2. A distributed optical fiber sensing signal processing method for safety monitoring of an underground pipe network, comprising steps of:
   Step 1, picking up sound or vibration signal at each point along a line of a detection cable laid within a monitoring range;
   Step 2, extracting a customized short time feature according to a relative value of the sound or the vibration signal collected in a whole monitoring area at each spatial point; and
   Step 3, detecting an abnormal event occurs or not at each spatial point according to the short time feature, wherein then a long time feature is calculated and accumulated for the signal of the abnormal event, then values of these features are discretized after calculation and accumulation, then these discrete values of features are input into a Bayesian identification and classification network which is trained for each spatial point to realize identification and classification;
   wherein detailed steps of the Step 3 are:
   Step 3.1, detecting abnormality of the sound or the vibration signal at each spatial point according to the short time feature, when threshold is given, and;
   Step 3.2, if the abnormal event is detected at certain spatial point, calculating and accumulating the long time feature at this point from a moment when the abnormal event occurs, then the values of these features are discretized after calculation and accumulation; and
   Step 3.3, inputting discretization results into the Bayesian identification and classification network which is trained for the corresponding spatial point to execute identification and classification;
   wherein in the Step 3, detailed steps of construction of the Bayesian identification and classification network which is trained for the each spatial point are:
   Step 31, accumulating the sound or the vibration signal and then preprocessing it, wherein then a typical event data training set is built based on a long time signal which is obtained from pretreatment;
   Step 32, extracting the customized short time feature from the relative value of the signal for the typical event data training set, wherein the long time feature is calculated and accumulated, after the extraction, then the typical event data training set is transformed into a long time feature training set; and
   Step 33, constructing the Bayesian identification classification network topology and learning the parameter based on the probability distribution information of the long time feature in the long time data training set and combined with prior probability information of a background environment at each spatial point, thus obtaining the trained Bayesian identification classification network;
   wherein detailed steps of the Step 32 are:
   Step 321, extracting four customized short time features based on a relative quantity of the signals from the short time signal: a primary impulse intensity feature $A_1$, a secondary impulse intensity feature $A_2$, a primary and secondary impulse amplitude ratio feature $A_3$, and a wavelet packet energy spectrum feature $A_4$;
   Step 322, calculating and accumulating the short time features to get six customized long time features, which include a long time primary impulse intensity feature $B_1$, a long time secondary impulse intensity feature $B_2$, a long time amplitude ratio feature $B_3$, a long time wavelet packet energy spectrum feature $B_4$, a long time environmental background feature $B_5$ and a long time strict impulse number feature $B_6$; and Step 323, according to the long time features and corresponding event type tags thereof, transforming the typical event data training set into the long time feature training set.

3. A distributed optical fiber sensing signal processing method for safety monitoring of an underground pipe network, comprising steps of:
- Step 1, picking up sound or vibration signal at each point along a line of a detection cable laid within a monitoring range;
- Step 2, extracting a customized short time feature according to a relative value of the sound or the vibration signal collected in a whole monitoring area at each spatial point; and
- Step 3, detecting an abnormal event occurs or not at each spatial point according to the short time feature, wherein then a long time feature is calculated and accumulated for the signal of the abnormal event, then values of these features are discretized after calculation and accumulation, then these discrete values of features are input into a Bayesian identification and classification network which is trained for each spatial point to realize identification and classification;
- wherein detailed steps of the Step 3 are:
- Step 3.1, detecting abnormality of the sound or the vibration signal at each spatial point according to the short time feature, when threshold is given, and;
- Step 3.2, if the abnormal event is detected at certain spatial point, calculating and accumulating the long time feature at this point from a moment when the abnormal event occurs, then the values of these features are discretized after calculation and accumulation; and
- Step 3.3, inputting discretization results into the Bayesian identification and classification network which is trained for the corresponding spatial point to execute identification and classification;
- wherein in the Step 3, detailed steps of construction of the Bayesian identification and classification network which is trained for the each spatial point are:
- Step 31, accumulating the sound or the vibration signal and then preprocessing it, wherein then a typical event data training set is built based on a long time signal which is obtained from pretreatment;
- Step 32, extracting the customized short time feature from the relative value of the signal for the typical event data training set, wherein the long time feature is calculated and accumulated, after the extraction, then the typical event data training set is transformed into a long time feature training set; and
- Step 33, constructing the Bayesian identification classification network topology and learning the parameter based on the probability distribution information of the long time feature in the long time data training set and combined with prior probability information of a background environment at each spatial point, thus obtaining the trained Bayesian identification classification network;
- wherein the step 33 comprises steps of:
- Step 331, discretizing the long time feature training set to construct a discrete long time feature training set;
- Step 332, according to mutual information of all long time feature attribute nodes and class nodes obtained from the discrete long time feature training set at each spatial point, and conditional mutual information between feature attribute nodes under a class node condition, constructing a Bayesian network topology; and
- Step 333, constructing the Bayesian network topology at each spatial point wherein parameters are further studied based on the constructed Bayesian network topology to obtain the trained Bayesian identification classification network wherein the step 332 comprises steps of:
Step 3321, calculating the mutual information between the long time feature attribute node and the class node:
wherein the mutual information between all the long time feature attribute node B and the class node C is calculated as follows:

$$I(B_j; C) = \sum_{b \in S_b} \sum_{c \in \{1,2\}} p(b'_j, c) \log \frac{p(b'_j, c)}{p(b'_j)p(c)} (j = 1, 2, \ldots, 6); \quad (15)$$

in Eq. (15), $S_b$ denotes a set of all possible discrete values taken for the long time feature attribute node $B_j$ (j=1, 2, ..., 6) $p(b'_j, c)$ represents a joint probability when $B_j = B'_j$, C=c; $p(b'_j)$ represents a probability when $B_j = b'_j$; values of $p(b'_j, c)$ and $p(b'_j)$ are obtained from the discrete long time feature training set, and a calculation method is: $p(b'_j, c)$ equals a number of records in the discrete long time feature training set when $B_j = b'_j$, C=c, divided by a total number of records in the discrete long time feature training sets; and $p(b'_j)$ equals a number of records in the discrete long time feature training set when $B_j = b'_j$, divided by the total number of records in the discrete long time feature training sets;

Step 3322, calculating the conditional mutual information between each two of all the feature attribute nodes under the class node condition;
wherein according to the discrete long time feature training set, calculation of the condition mutual information between each two feature attribute nodes $B_i, B_j$ (i≠j, and i=1,2,..., 6, j=1,2,..., 6) under the condition of class node C is:

$$I(B_i; B_j | C) = \sum_{b'_i=0}^{n} \sum_{b'_j=0}^{h} \sum_{c=1}^{2} p(b'_i, b'_j, c) \log \frac{p(b'_i, b'_j | c)}{p(b'_i | c)p(b'_j | c)}, \quad (16)$$

$$(i = 1, 2, \ldots, 6, j = 1, 2, \ldots, 6; i \neq j);$$

in Eq. (16), $b'_i$ represents a discrete value of $B_i$, and n represents a maximum of possible discrete values of $B_i$; $b'_j$ represents a discrete value of $B_j$, and h represents a maximum of the discrete value of $B_j$; c represents a value of a class node C, and $p(b'_i, b'_j, c)$ represents a joint probability when $B_i = b'_i, B_j = b'_j, C = c$; $p(b'_i, b'_j | c)$, $p(b'_i | c)$ and $p(b'_j | c)$ are corresponding conditional probabilities, whose calculation methods are: $p(b'_i, b'_j, c)$ equals the number of records in the discrete long time feature training set when $B_i = b'_i, B_j = b'_j, C = c$, divided by the total number of records in discrete long time feature training sets; $p(b'_i, b'_j | c)$ equals the number of records in the discrete long time feature training set when $B_i = b'_i$, $B_j = b'_j, C = c$, divided by the number of C=c records in the discrete long time feature training set; calculation of $p(b'_i | c)$ and $p(b'_j | c)$ is similar to that of $p(b'_i, b'_j | c)$;

Step 3323, initialization: defining a set S1=∅, and a set S2={$B_1, B_2, \ldots, B_6$}, wherein one of the feature attribute node $B_j$ (j=1,2,..., 6) in S2 is chosen to make $I(B_j;C)$ achieve a maximum value thereof; then an arc is added from the class node C to $B_j$, that is, the node C is taken as a parent node of $B_j$; and Step 3324, choosing one long time feature attribute node $B_j$ in S2 to make the $I(B_j;C)$ get to the maximum value; wherein then the arc is added from C to $B_j$; let k=min (|S1|,2), top k long time feature attribute nodes in S1 to make $I(B_i;B_j|C)$ get to a maximum; then k arcs are added from node $B_i$ to node $B_j$ in the network, and the long time feature attribute node $B_j$ is added to S1, and $B_j$ is deleted from S2; the above operation is cycled from choice of $B_j$ in S2 until the set S1 include all of the long time feature attribute nodes;

when determining the Bayesian network topology, the $B_6$ is deleted from the set S2 first, and add to the set S1; remaining nodes in the set S2 are $\{B_1,B_2,B_3,B_4,B_5\}$; in a new set S2, $B_2$ and the class node C have biggest mutual information, and k=min(|S1|,2)=1, then k nodes are selected in S1 as the parent nodes of $B_2$ which makes $I(B_i;B_2|C)$ the largest; it also means $B_6$ is the parent node of $B_2$, then $B_2$ is deleted from the set S2, and add to the set S1; meanwhile, S2=$\{B_1,B_3,B_4,B_5\}$, and S1=$\{B_2,B_6\}$; then in the new set S2, $B_5$ and the class node C have biggest mutual information, and k=2, then we choose k nodes in S1 as parent nodes of $B_5$, which makes $I(B_i;B_2|C)$ the largest; then $B_5$ is deleted from the set S2, and added to the set S1; the above operation is cycled until the set S2 is empty.

\* \* \* \* \*